(12) United States Patent
Sawada (10) Patent No.: US 6,855,233 B2
(45) Date of Patent: Feb. 15, 2005

(54) APPARATUS FOR PRODUCTION OF STRONG ALKALI AND ACID ELECTROLYTIC SOLUTION

(75) Inventor: Yuichi Sawada, Izumo (JP)

(73) Assignee: Kinji Sawada, Tokyo (JP)

( * ) Notice: Subject to any disclaimer, the term of this patent is extended or adjusted under 35 U.S.C. 154(b) by 159 days.

(21) Appl. No.: 10/294,755

(22) Filed: Nov. 15, 2002

(65) Prior Publication Data

US 2004/0094406 A1 May 20, 2004

(51) Int. Cl.$^7$ .............................. C25B 15/00; C25B 9/00
(52) U.S. Cl. ....................... 204/263; 204/237; 204/238; 204/229.8; 204/266; 204/261
(58) Field of Search ................................. 204/263–266, 204/237–238, 229.8, 261, 282, 283

(56) References Cited

U.S. PATENT DOCUMENTS

| | | | |
|---|---|---|---|
| 4,448,662 A | * | 5/1984 | DuBois et al. ............... 204/252 |
| 4,472,255 A | * | 9/1984 | Millington et al. .......... 204/255 |
| 5,965,009 A | * | 10/1999 | Shimamune et al. ........ 205/742 |
| 6,126,796 A | * | 10/2000 | Shimamune et al. ........ 204/263 |

* cited by examiner

Primary Examiner—Donald R. Valentine
(74) Attorney, Agent, or Firm—Young & Thompson (57) ABSTRACT

There is provided an apparatus for producing strong alkaline reductive electrolyzed water and acidic water that enables efficient production of electrolyzed water that has excellent washing and sterilizing effects. There is provided an apparatus for producing strong alkaline reductive electrolyzed water and acidic water, which includes an electrolyzer provided with a strong alkaline reductive electrolyzed water-producing chamber, an acidic water-producing chamber and a partitioning membrane, wherein a flow path diffusing device is provided in the electrolyzer, and a gap between the cathode plate and the anode plate of 0.1 mm to 1 mm.

9 Claims, 3 Drawing Sheets

APPARATUS FOR PRODUCTION OF STRONG ALKALI AND ACID ELECTROLYTIC SOLUTION

BACKGROUND OF THE INVENTION

1. Field of the invention

The present invention relates to an apparatus for producing strong alkaline reductive electrolyzed water and acidic water. More particularly, the present invention relates to an apparatus for producing strong alkaline reductive hydrolytic water and acidic water, which allows for efficient production of electrolyzed water having excellent washing and sterilizing effects.

2. Related art

There have been hitherto known various apparatuses for producing electrolyzed water. For example, Japanese Patent Application Laid-Open No. 2001-070941 discloses a batch-type apparatus for producing electrolyzed water by which produced electrolyzed water is stored. Since this electrolyzed water-producing apparatus is batch-type, there is a problem that electrolyzed water cannot be continuously produced, and the apparatus must be scaled up in size in order to obtain a large amount of electrolyzed water.

In addition, Japanese Patent Application Laid-Open No. 2001-062453 discloses an apparatus for producing electrolyzed water by producing bacteria-removed water by further electrolyzing electrolyzed water that is not to be used. In any event, this electrolyzed water-producing apparatus produces two kinds of electrolyzed water, and it is not possible to efficiently produce only one of the electrolyzed waters.

SUMMARY OF THE INVENTION

Thus, any electrolyzed water-producing apparatuses have problems of low production efficiency and production of water that is not satisfactory in its washing and sterilizing effects.

The present invention has been realized in order to solve the above problems. It is the objective of the present invention to provide an apparatus for producing strong alkaline reductive electrolyzed water and acidic water that enables efficient production of electrolyzed water that has excellent washing and sterilizing effects.

In order to achieve the aforementioned objective, the first aspect of the invention is an apparatus for producing strong alkaline reductive electrolyzed water and acidic water, which is comprised of an electrolyzer for producing strong alkaline reductive electrolyzed water and acidic water, which is provided with a strong alkaline reductive water-producing chamber provided with a cathode plate, a raw material water introducing inlet and a strong alkaline reductive electrolyzed water draining outlet, an acidic water-producing chamber provided with an anode plate, a raw material water introducing inlet and an acidic water draining outlet, and a membrane for partitioning the alkaline reductive electrolyzed water-producing chamber and the acidic water-producing chamber, wherein a flow path diffusing device acting so that the raw material water and electrolytes to be introduced in the electrolyzer together with the raw material water effectively make contact with the whole surface of the anode and that of the cathode, is provided in the electrolyzer, and a gap or distance between the cathode plate and the anode plate that is 0.1 mm to 1 mm.

Accordingly, electrolyzed water since a flow path diffusing device is provided in the electrolyzer and the gap between the anode plate and the cathode plate is very small, i.e., 0.1 mm to 1 mm, it is possible to continuously produce strong alkaline reductive electrolyzed water and acidic water at an extremely high efficiency and in a large volume, and, since the strong alkaline reductive electrolyzed water and acidic water that are produced have very high washing ability and sterilizing effects, the apparatus can be used for washing, sterilization and bacteria-removal in a variety of applications.

In the first aspect of the invention, either the strong alkaline reductive electrolyzed water-draining outlet or the acidic water-draining outlet may be connected to a circulating path for circulating strong alkaline reductive electrolyzed water or acidic water discharged from these outlets, to introduce again those waters into an electrolyzer.

In this way, by connection of a circulating path, either strong alkaline reductive electrolyzed water or acidic water can be recovered for use, and the other can be circulated and, thus, either of the waters can be effectively produced. In addition, by circulating electrolyzed water, by the method of placing electrolytes into the electrolyzers of both electrodes by the previous method, waste occurs by discharge of electrolyte components which are not electrolyzed (discharged together with electrolyzed water), but in the present invention, electrolyte components which are not electrolyzed are recovered by means of circulating the electrolyte, and can be reutilized, generating no waste.

Further, the aforementioned circulating path may be provided with an electrolyte supplying container filled with 1 or 2 or more additives selected from the group consisting of calcium carbonate, sodium bicarbonate, sodium chloride, ammonium chloride, calcium chloride and potassium chloride, in order to simply supply electrolyte components in an electrolyzer which have been lost by electrolysis.

In this way, since the necessary amount of additives is supplied to the raw material water by provision of an electrolyte supplying container filled with additives, waste of electrolyte components is eliminated, it is not necessary to perform a continuous operation of placing additives therein, and electrolytes necessary for electrolysis can be supplied to the raw material water without setting an amount of electrolytes.

In this case, it is preferable that additives to be filled into the aforementioned electrolyte supplying container be in a pellet or solid form.

Further, there may be provided a gas releasing device for releasing oxygen gas and hydrogen gas generated in the aforementioned electrolyzer to the outside of the apparatus.

Since electrolyzed water which is circulated in a circulating path (meaning electrolyzed water which is not used, and is one or the other of strong alkaline reductive electrolyzed water or acidic water) is not released, oxygen is generated on the cathode side and hydrogen gas is generated in electrolysis of water. In this case, the gas in electrolyzed water that is used is released to the outside, but the gas in electrolyzed water that is not used is accumulated in the interior of the apparatus, leading to increase in pressure in the electrolyzer and the circulating path. However, in the present invention, increase in pressure can be prevented by a gas-releasing device (for example, a motorcar gas-releasing pressure valve is provided on the upper part of the electrolyzer).

In addition, there may be provided a raw material water-automatically supplying device for automatically supplying the same amount as that of decreased raw material water when raw material water circulating in the aforementioned circulating path is deficient.

The raw material water-automatically supplying device can be a combination of an automatically supplying tank and a water level-detector or a combination of an automatically supplying tank and a ball tap.

Further, in the first aspect of the invention, it is preferable that the source for supplying electricity to the cathode plate and the anode plate be a constant current type direct current electricity source.

In addition, there is provided a voltmeter for measuring the voltage value of the constant current type direct current electricity source and a detecting device for informing the case where the voltage measured by the voltmeter rises above a set voltage value, whereby, a supplying time and an exchange time for the electrolyte may be informed.

When the concentration of electrolytes in raw material water is reduced below a predetermined concentration, a constant current type direct current electricity source tries to maintain a current value to raise the voltage. Therefore, a voltage value of a constant current type direct current electric source above a set voltage value means that the concentration of electrolytes in raw material water is reduced below a predetermined concentration. In this case, by provision of a voltmeter for measuring the voltage value of a constant current type direct current electric source and a detecting device (e.g. buzzer and lamp) for informing the case where the voltage measured by the voltmeter becomes above a set voltage value, one can recognize immediately a decrease in the electrolytes.

In the first aspect of the invention, as pre-treatment of raw material water that is introduced into the chamber for producing strong alkaline reductive electrolyzed water, there may be provided an impurity-removing device for removing substances interfering with the productivity of alkaline water from the raw material water.

As this impurity-removing device, one apparatus, a combination of 2 or more apparatuses selected from the group consisting of a RO membrane filtering apparatus, a UF membrane filtering apparatus, an ion-exchanging resin treating apparatus, active carbon treating apparatus and a zeolite treating apparatus, can be used.

By so doing, long term avoidance of attachment of scale to the electrodes and prolongation of life of the electrodes and a partitioning membrane can be achieved, and the distillation residue from electrolyzed water utilized in washing can be decreased. When an active carbon treating apparatus or a zeolite treating apparatus is used, chlorine remaining in raw material water can be removed.

The present invention further includes many other embodiments described below in detail. A person skilled in the art can understand that the present invention includes many other embodiments obtained by variation or alteration based on the following detailed description without departing from the concept or category of the present invention defined only in "WHAT IS CLAIMED," below.

DETAILED DESCRIPTION OF THE PREFERRED EMBODIMENTS

Embodiments of the present invention will be explained below by referring to the drawings.

Figure 1:
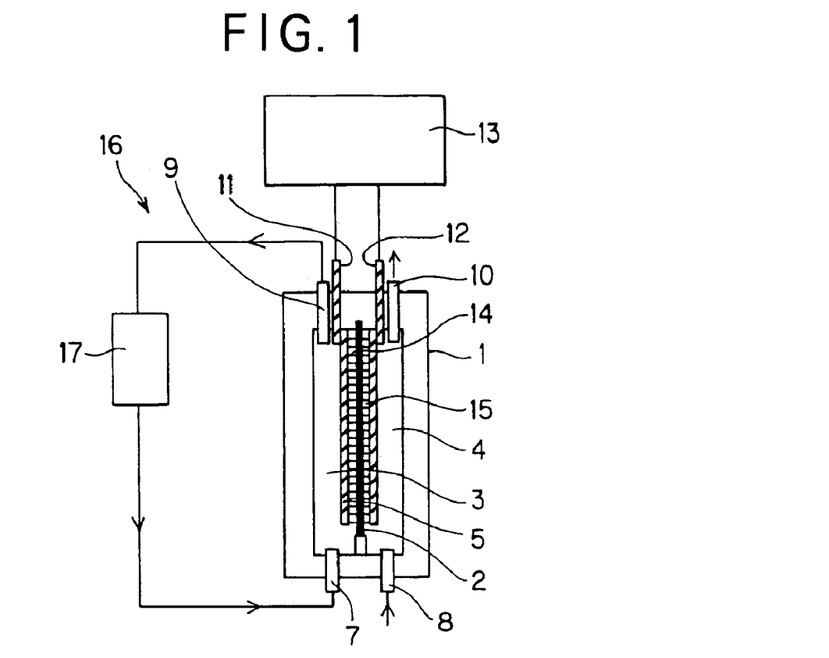
FIG. 1 is a front cross-sectional view showing an apparatus for producing strong alkaline reductive electrolyzed water and acidic water relating to one embodiment of the present invention.
Figure 2:
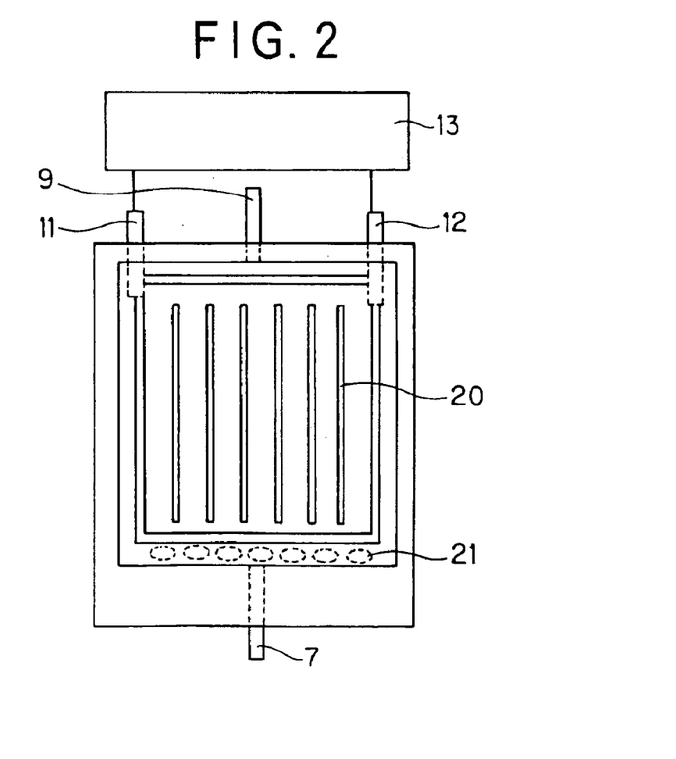
FIG. 2 is a left side view showing the apparatus for producing strong alkaline reductive electrolyzed water and acidic water shown in FIG. 1.
Figure 3:
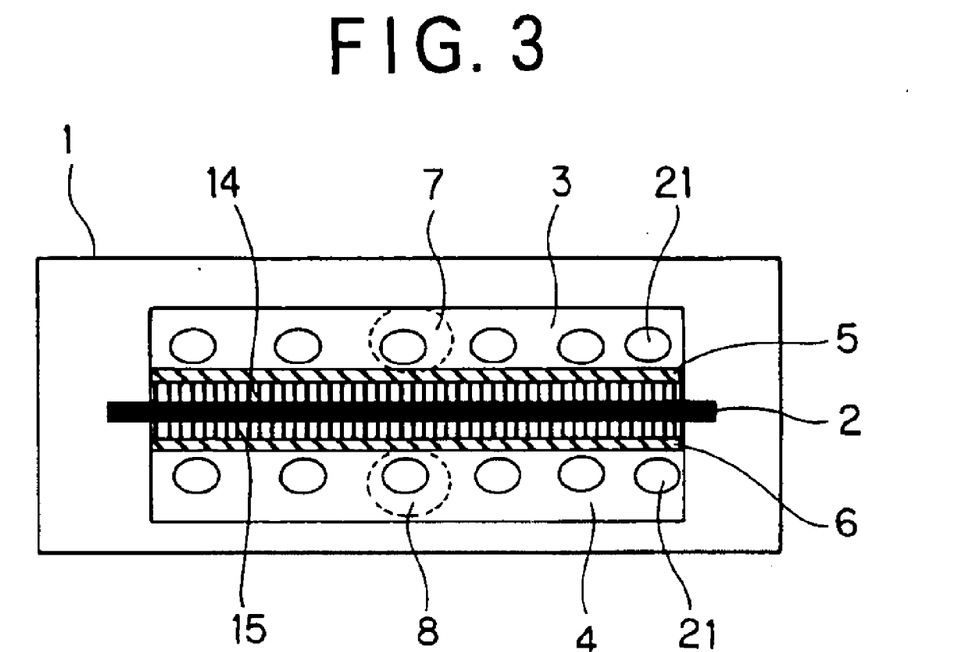
FIG. 3 is a bottom view showing the apparatus for producing strong alkaline reductive electrolyzed water and acidic water shown in FIG. 1.

FIG. 1 is a cross-sectional view showing an apparatus for producing strong alkaline reductive electrolyzed water and acidic water relating to one embodiment of the present invention, FIG. 2 is a left side view showing the apparatus for producing strong alkaline reductive electrolyzed water and acidic water shown by FIG. 1, and FIG. 3 is bottom view showing the apparatus for producing strong alkaline reductive electrolyzed water and acidic water shown by FIG. 1.

In FIG. 1 and FIG. 2, an electrolyzer 1 constituting the main part of the apparatus for producing strong alkaline reductive electrolyzed water and acidic water relating to the present embodiment is separated into an acidic water-producing chamber 3 and a strong alkaline reductive electrolyzed water-producing chamber 4 by a partitioning membrane 2. An anode plate 5 is arranged in the acidic water-producing chamber 3, a cathode plate 6 is arranged in the strong alkaline reductive electrolyzed water-producing chamber 4, and these electrode plates are disposed opposite to each other via the partitioning membrane 2. In addition, in the acidic water-producing chamber 3, a raw material water introducing inlet 7 for introducing raw material water into the chamber and an acidic water-draining outlet 9 for draining acidic water produced in the chamber, are provided. On the other hand, in the strong alkaline reductive electrolyzed water-producing chamber 4, a raw material water introducing inlet 8 for introducing raw material water into the chamber and a strong alkaline reductive electrolyzed water draining outlet 10 for draining alkaline reductive electrolyzed water produced in the chamber, are provided.

In the apparatus of the present invention, spacers 14 and 15 for retaining a gap of 0.1 mm to 1 mm between the partitioning membrane 2 and the anode plate 5 and between the partitioning membrane 2 and the cathode plate 6.

In the acidic water-producing chamber 3 and the alkaline water-producing chamber 4, a flow path diffusing device allowing raw material water introduced into each chamber to make contact with the whole surface of the cathode plate 6 and the anode plate 5, is provided.

Examples of the flow path diffusing device include a dashboard 20 for separating evenly the interior of the acidic water-producing chamber 3 and that of the strong alkaline reductive electrolyzed water-producing chamber 4, and a water path dispersing port for dispersing the water path of raw material water introduced in the chamber, which is disposed near raw material introducing inlets 7 and 8 in the chamber.

The cathode plate 6 is connected to an electrolysis direct current constant current electricity source 13 via a cathode side electricity source connecting terminal 12, and the anode plate 5 is connected to an electrolysis direct current constant current electricity source 13 via an anode side electricity source connecting terminal 11.

In the apparatus for producing strong alkaline reductive electrolyzed water and acidic water of the present invention constructed as described above, as an electrode material for an anode plate 5 and a cathode plate 6, a material which is very resistant to oxidation, such as titanium and the like, is selected because electrode material is easily oxidized due to active electron transference between electrodes by electrolysis, and it is desirable that the surface of the selected material be covered with a noble metal such as platinum or iridium. In addition, since the polarity of the electric source is switched in some cases, it is desirable that both the cathode plate 5 and the anode plate 6 are covered similarly.

The anode plate 5 and the cathode 6 are processed into a shape such as expanded, circular hole, cross hole and square hole, as well as slit-like long hole so that components of an aqueous solution easily flow therein (ions are easily exchanged).

The distance or gap between the anode plate 5 and the cathode plate 6 is 0.1 mm to 1 mm. The lower limit is 0.1 mm because it is almost the same thickness as that of the partitioning membrane 2. Therefore, the distance between each electrode and the partitioning membrane may be zero, that is, the electrode and the partitioning membrane may contact each other. When the gap between the anode plate 5 and the cathode plate 6 exceeds 1 mm, the voltage is remarkably raised in some cases in the case of constant current and, in addition, when constant current cannot be retained due to the increase in voltage since the electrolytic ability is reduced. The above gap is to prevent such problems from occurring. Although such a problem can be overcome by raising the voltage, this leads to an uneconomical situation in all aspects of consumed electric power and electrode abrasion, and is not preferable.

In the apparatus for producing strong alkaline reductive electrolyzed water and acidic water of the present invention, as a partitioning membrane 2, various ion-exchanging membranes, that is, cationic exchanging membranes or anionic exchanging membranes, can be selected depending on the intended use of the electrolyzed water. In addition, the thickness of the membrane can be appropriately selected depending on use frequency.

For example, when strong alkaline reductive electrolyzed water is intended to be produced mainly, it is preferable to use a cationic exchanging membrane from the viewpoint of electrolytic efficiency and, when acidic water is intended to be produced mainly, it is preferable to use an anionic exchanging membrane.

In the apparatus for producing strong alkaline reductive electrolyzed water and acidic water of the present invention, an electricity source used for supplying electricity to the anode plate 5 and the cathode plate 6 is a constant current type direct current electricity source 13. According to this constant current type direct current electricity source 13, a set current value can be maintained all the time and a stable electrolytic state can be retained when the current is switched on. In addition, against an increase in resistance due to attachment of scale to the surface of an electrode, the electricity source has the function of maintaining a set current value by automatically increasing the voltage, and can similarly respond to a decrease in current due to deterioration of an electrode. For example, the set value of the constant current may be 12A (the set value of a constant current can be set variably), and the voltage controlling range may be 0 to 40V.

In addition, a circulating path 16 for circulating strong alkaline reductive electrolyzed water or acidic water drained from the strong alkaline reductive electrolyzed water draining outlet 10 or the acidic water draining outlet 9 and introducing again the water into an electrolyzer 1 may be connected to either the strong alkaline reductive electrolyzed water draining outlet 10 or the acidic water draining outlet 9 (acidic water draining outlet 9 in FIG. 1) in the apparatus for producing strong alkaline reductive electrolyzed water and acidic water of the present invention. By provision of the circulating path 16, electrolyzed water which is not to be utilized (acidic water in the case of FIG. 1) can be reutilized, and electrolyzed water which is desired to be utilized (strong alkaline reductive electrolyzed water in the case of FIG. 1) can be effectively produced.

The circulating path 16 can be formed by utilizing ordinary plumbing piping that is in common use.

Herein, various additives can be added to raw material water that is electrolysis-treated by the apparatus for producing strong alkaline reductive electrolyzed water and acidic water of the present invention. In this case, the additives are not added directly to raw material water, but the additives, for example, sodium bicarbonate and sodium chloride, are blended and formed into a solid shape or a pellet shape having a diameter of around 3 mm to 10 mm, and this is filled into a circulating water reservoir or an electrolyte supplying container 17 (see FIG. 1), which may be provided in the circulating path 16. By provision of the circulating water reservoir or the electrolyte supplying container 17 filled with the solid-like or pellet-like additives in the circulating path 16, since solid-like or pellet-like electrolyte components in which sodium bicarbonate and sodium chloride are mixed in the electrolyte supplying container 17 are dissolved into raw material water depending on a required amount, the equivalent addition effect can be obtained by a simpler method as compared with a method of continuing to add the additives to raw material water all the time.

Alternatively, a housing for accommodating the solid-like or pellet-like electrolyte can be attached to the raw material water supplying side of the electrolyzed water producing apparatus (a cartridge is desirable for easy exchange), raw material water is introduced into the housing so that the water contains the additive, which is introduced into the electrolyzed water producing apparatus (not shown).

Upon preparation of the solid or pellet-like electrolyte, for example by varying the mix and kinds of additives, e.g., sodium bicarbonate and sodium chloride, components at production of strong alkaline reductive electrolyzed water and acidic water can be obtained, depending on the purpose.

In this way, by using the solid or pellet-like electrolyte, since it is not necessary to continuously add more electrolyte once the electrolyte has been placed therein, labor can be considerably omitted as compared with the previous manner of adding the electrolyte in the form of an aqueous solution.

Figure 4:
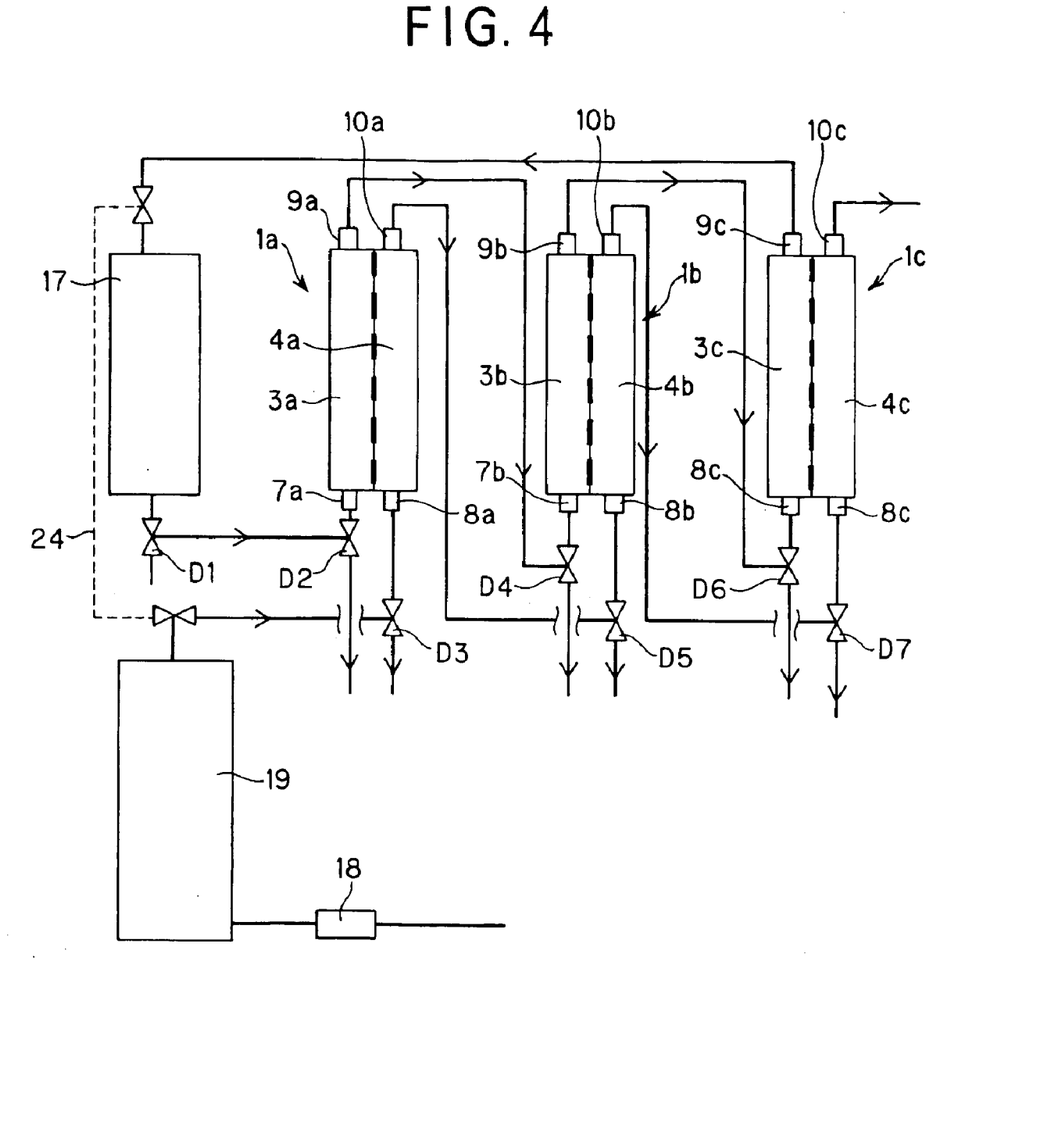
FIG. 4 is a view showing the overall structure of the apparatus for producing strong alkaline reductive electrolyzed water and acidic water of the present invention.

FIG. 4 is a view showing the overall structure of the apparatus in which a plurality of units are connected, letting the apparatus for producing strong alkaline reductive electrolyzed water and acidic water of the present invention as described above to be one unit.

The apparatus for producing strong alkaline reductive electrolyzed water and acidic water of the present invention can be used by unitizing by connecting a plurality of units, letting an electrolyzer 1 which is separated into an acidic water-producing chamber and a strong alkaline reductive electrolyzed water-producing chamber 4 by a partitioning membrane 2 to be one unit, that is, by connecting an acidic water draining outlet 9 in one electrolyzer 1 and a raw material water introducing inlet 7 provided in an acidic water-producing chamber 3 in another electrolyzer 1 with a pipe, and connecting a strong alkaline reductive electrolyzed water draining outlet 10 in the one electrolyzer 1 and a raw material water introducing inlet 8 provided in a strong alkaline reductive electrolyzed water-producing chamber 4 in another electrolyzer 1 (see FIG. 4). Depending on the required properties of electrolyzed water (washing ability, sterilizing or bacteria-removing ability) and a required amount of production, for example, 2 units, or 10 units can be connected. Connection may be in series or parallel.

When unitized like this, strong alkaline reductive electrolyzed water having a higher pH value can be produced in the case where an apparatus having 2 units connected in series is used, as compared with an apparatus consisting of one unit. In addition, also when an amount of produced electrolyzed water is increased, strong alkaline reductive electrolyzed water having a sufficiently high pH value can be produced.

The electrolyzed water producing apparatus of the present invention can be used in various modes that will be explained below by referring to FIG. 4.

In FIG. 4, a bold line means a pipe used in each mode, and any symbol D means a valve that is opened and closed in each mode. In FIG. 4, as an apparatus for producing strong alkaline reductive electrolyzed water and acidic water, 3 units 1a, 1b, and 1c are arranged and, at its front side (upstream side), one apparatus, or a combination of 2 or more apparatuses selected from the group consisting of a reverse osmosis (RO) membrane filtering apparatus, an ultra filtration (UF) membrane filtering apparatus, an ion-exchanging resin treating apparatus, an active carbon treating apparatus and a zeolite treating apparatus as an electrolyte supplying container 17 and an impurity removing device 18, and further a raw material water reservoir 19 are arranged. The interior of the electrolyte supplying container 17 is filled with a solid or pellet-like additive.

For example, raw material water pre-treated with an ion-exchanging resin apparatus as an impurity removing device 18 is stored once in a raw material water reservoir 19, and is introduced into each unit 1a, 1b or 1c through a pipe by a pump (not shown).

The strong alkaline reductive electrolyzed water and acidic water draining outlet 10a of the unit 1a is connected to the raw material water introducing inlet 8b provided in the strong alkaline reductive electrolyzed water-producing chamber 4b of the unit 1b, and the strong alkaline reductive electrolyzed water draining outlet 10b of the unit 1b is connected to the raw material water introducing inlet 8c provided in the strong alkaline reductive electrolyzed water-producing chamber 4c of the unit 1c. From the strong alkaline reductive electrolyzed water draining outlet 10c of the unit 1c, strong alkaline reductive electrolyzed water can be obtained.

On the other hand, the acidic water draining outlet 9a of the unit 1a is connected to the raw material water introducing inlet 7b provided in the acidic water-producing chamber 3b of the unit 1b, and the acidic water draining outlet 9b of the unit 1b is connected to the raw material water introducing inlet 7c provided in the strong alkaline reductive electrolyzed water-producing chamber 3c of the unit 1c. The acidic water draining outlet 9c of the unit 1c is connected to the circulating path 16 as described above. Therefore, acidic water drained from the acidic water draining outlet 9c of the unit 1c is introduced again into the acidic water-producing chamber 3a of the unit 1a (reutilized) via the electrolyte supplying container 17 provided in the circulating path 16.

In FIG. 4, 3 units 1a, 1b and 1c are connected in series. However, 2 units or 3 or more units may be used, and they may be connected either in series or in parallel for the same results.

Symbols D1, D2, D3, D4, D5, D6 and D7 in FIG. 4 each denote a drain valve, respectively, and the drain valve opens each drain for removal of electrode scale and eliminates scale and the like. A pipe 24 denoted by a dotted line is a pipe which is provided for supplying raw material water from the raw material water reservoir 19 when the amount of water in the electrolyte supplying container 17 is reduced.

(1) Mode of using strong alkaline reductive electrolyzed water alone

A view showing the overall structure of an apparatus for producing strong alkaline reductive electrolyzed water and acidic water in this mode is shown in FIG. 4. In this mode, cathode plates in strong alkaline reductive electrolyzed water-producing chambers (4a, 4b, 4c) of respective units are minus electrodes, and strong alkaline reductive electrolyzed water produced therein is drained through strong alkaline reductive electrolyzed water-draining outlets (10a, 10b, 10c) of respective units, introduced into the next unit by a pipe and, finally, strong alkaline reductive electrolyzed water can be obtained from the strong alkaline reductive electrolyzed water draining outlet 10c of the final unit (1c in the case of the figure). On the other hand, in the acidic water-producing chamber, raw material water (acidic water) is circulated and reutilized as described above.

(2) Mode of removing scale at electrode polarity reversal

To operate the apparatus for producing strong alkaline reductive electrolyzed water and acidic water of the present invention in this mode, each electrode's polarity is reversed, electric power is supplied for a constant time, and removal of electrode scale is performed and, thereafter, drain valves D2, D3, D4, D5, D6 and D7 are opened, scale attached to the electrodes is removed, and water containing scale is drained.

(3) Mode of using alkaline reductive electrolyzed water alone at polarity reversal after removal of scale In this mode, strong alkaline reductive electrolyzed water is drained from the alkaline reductive electrolyzed water draining side (acidic water draining side in the mode of (1)) of units 1a, 1b and 1c and supplied for use. On the other hand, acidic water is circulated as return water. Waters are returned to each operation (1).

(4) Mode of using acidic water

In this mode, connection and the like are the same as those of (1), but acidic water-producing chambers 3a, 3b and 3c are cathodes, and strong alkaline reductive electrolyzed water-producing chambers 4a, 4b and 4c are anodes. Therefore, acidic water is drained for use, from the strong alkaline reductive electrolyzed water draining outlet 1c through which strong alkaline reductive electrolyzed water should have been drained previously. On the other hand, alkaline water is circulated as return water.

EXAMPLES

Various Examples of the present invention will be set forth below, and the effects of the invention will be explained more specifically.

Example 1

An apparatus A (hereinafter, simply referred to as "apparatus A") for producing strong alkaline reductive electrolyzed water and acidic water provided with no raw material water flow path diffusing device and an apparatus B (apparatus of the present invention, hereinafter, simply referred to as "apparatus B") for producing strong alkaline reductive electrolyzed water and acidic water provided with a raw material water flow path diffusing device, which have the structures shown in FIG. 1 to FIG. 3, were constructed as follows:

Apparatus A: Without flow path restricting device
  Depth of electrolyzer 15 mm
  Fluid and electrode contacting area 250 cm$^2$
Apparatus B: With flow path restricting device
  Width of electrolyzer flow path 10 mm×depth 15 mm
  Fluid and electrode contacting area 250 cm$^2$
Electrolyte Components and Blending
Apparatus A: 40 g of solid-like sodium chloride as an electrolyte was used.
Apparatus B: A mixed solid of 10 g of sodium chloride and 30 g of sodium bicarbonate as an electrolyte was used.

In both apparatuses A and B, as alkaline side raw material water, water after filtration with a UF membrane was supplied.

As a raw material water flow path diffusing device, partitioning walls (thickness 3 mm) were arranged at 7 places at intervals of 10 mm in an electrode traverse direction so that liquid is diffused evenly in an electrode surface longitudinal direction and, as an electrode, a titanium material having the surface covered with platinum and having a dimension of 200×125 mm and a thickness of 1 mm was used.

Letting the aforementioned apparatuses A and B to be one unit, by using one unit, and two units containing above two units connected in series, electrolyzed waters were produced, and a pH value and an oxidation-reduction potential (ORP) value of them were measured. The results thereof are shown in the following Table 1. Raw material water having pH of 6.9 to 7.1 and ORP of +288 to +319 mV at 19.3 to 20.5° C. was used.

From the aforementioned results, it was seen that, by provision of a flow path diffusing device and use of a mixed electrolyte in an apparatus of producing strong alkaline reductive electrolyzed water and acidic water, electrolyzed water can be produced stably and, at the same time, electrolyzed water having better quality can be obtained.

Example 2

By using the apparatus for producing strong alkaline reductive electrolyzed water and acidic water comprising the aforementioned two units as a test machine, strong alkaline reductive electrolyzed water and acidic water were produced. First, a solid electrolyte containing 10 g of sodium chloride and 30 g of sodium bicarbonate per 10 liters of water was filled in an electrolyte supplying container, was fed to an acidic water-producing chamber in the apparatus for producing strong alkaline reductive electrolyzed water and acidic water with a pump and, after electrolysis treatment, was returned to the electrolyte supplying container. Tap water after being filtered with a UF membrane was fed to the strong alkaline reductive electrolyzed water-producing chamber at almost the same amount as that to the acidic water-producing chamber, and strong alkaline reductive electrolyzed water was produced. PH of produced strong alkaline reductive electrolyzed water was 11.50.

Electrolysis was performed under the conditions of a voltage of 10V and current of 15 A.

By using 40 liters of strong alkaline reductive electrolyzed water having pH of 11.50 obtained as described above, a test of washing clothes was performed. That is, three kinds

TABLE 1

| | | | PH value | | ORP value mV | |
|---|---|---|---|---|---|---|
| Components of electrolyzer | Flow rate | Apparatus (A/B) | Alkaline production | Acidic production | Alkaline production | Acidic production |
| 1 unit | 5 L/min | A | 10.11 | 5.20 | −404 | +439 |
| (cathode 1, anode 1) | | B | 11.91 | 4.10 | −703 | +643 |
| | 10 L/min | A | 9.32 | 5.90 | −359 | +393 |
| | | B | 11.20 | 4.44 | −672 | +589 |
| 2 units | 5 L/min | A | 11.09 | 4.87 | −659 | +466 |
| (cathode 1, | | B | 12.33 | 4.0 | −836 | +701 |
| anode 1) × 2 | 10 L/min | A | 10.23 | 5.33 | −435 | +411 |
| (Piping in series) | | B | 11.51 | 4.46 | −688 | +564 |
| | 15 L/min | A | 9.37 | 5.79 | −374 | +418 |
| | | B | 10.89 | 4.92 | −617 | +446 |

From the above Table 1, it can be seen that pH of alkaline water is higher and ORP value of alkaline water is lower in the cathode chamber, and pH of acidic water is lower and ORP value of acidic water is higher in the anode chamber, in the apparatus B (apparatus of the present invention) provided with a raw material water flow path diffusing device in both 1 unit and 2 units of piping in series, as compared with the apparatus B provided no flow path diffusing device.

In addition, the similar experiment was repeated three times and, in the apparatus B provided with a flow path diffusing device, stable numerical values were obtained but, in the apparatus B provided with no flow path diffusing device, there was a certain extent of scatter in numerical values. In addition, regarding an electrolyte used, alkaline water and acidic water were more stably produced even at a high amount of flowing water in the case of a mixed electrolyte than in the case of sodium chloride alone.

Also in the case of 2 units, the similar tendency to that of one unit was seen.

of children's underwear (white, colored, patterned), a stain on which had not been removed using a normal detergent, were washed with a full automatic washing machine (manufactured by Sanyodenki) for 6 minutes.

As a result, the stain that had not been removed by a detergent was completely removed. In addition, there was no change in color in the colored underwear or no odor, although a slight bleaching effect was observed.

Example 3

In the present Example, as application of the above Example 2, strong alkaline reductive electrolyzed water having the high washing ability produced by the apparatus of the present invention was used as washing water for a washing machine, and acidic water having the bacteria-removing and deodorizing effects produced by the apparatus of the present invention was used as rinsing water.

By performing washing and rinsing according to the aforementioned procedures, the productivity of alkaline water for washing and that of acidic water for rinsing are improved, and compactification and reduced cost of the washing machine in the present apparatus become possible. In addition, at production of acidic water, the electrode polarity is reversed and, at the same time, scale attached to the electrode can be removed, the productivity of alkaline water is also improved, and drainage of reverse washing for electrode washing can be omitted and, therefore, unnecessary drainage for electrode washing can be omitted and, thus, a variety of effects can be obtained.

As described in detail above, according to the apparatus for producing electrolyzed water of the present invention, since a flow path diffusing device is provided in the electrolyzer and, at the same time, a gap between the cathode plate and the anode plate is very small, i.e., 0.1 mm to 1 mm, strong alkaline reductive electrolyzed water and acidic water can be continuously produced at an extremely high efficiency and in a large amount. In addition, by treating raw material water using one apparatus, or a combination of two or more apparatuses selected from the group consisting of a RO membrane filtering apparatus, a UF membrane filtering apparatus, an ion-exchanging resin treating apparatus, an active carbon treating apparatus and a zeolite treating apparatus, strong alkaline reductive electrolyzed water and acidic water can be produced stably in electrolysis in any raw material water.

In addition, regarding the electrolyte, for example, electrolyzed water of higher quality is obtained by use of a mixed electrolyte of sodium bicarbonate and sodium chloride as compared with use of sodium chloride alone. And, by processing chemical components of the electrolyte into a solid or pellet shape, a remaining amount can be easily confirmed, and supply and exchange can be simply performed.

Strong alkaline reductive electrolyzed water produced by the apparatus for producing strong alkaline reductive electrolyzed water and acidic water of the present invention has very high washing and sterilizing ability, and the apparatus can be compactified as compared with the previous electrolysis technique, and the large volume of strong alkaline reductive electrolyzed water necessary for washing can be continuously produced and supplied. Thereby, the apparatus can be built in for variety of uses and applications, for example, a clothes washing machine, cooking equipment, a dish washer and an industrial part washer, and can be used in washing, sterilizing and bacteria-removing for an extremely wide range of applications, such as for toilets, foods, outer walls of buildings and the like and, thus, the utility value is extremely high.

What is claimed is:

1. An apparatus for producing strong alkaline reductive electrolyzed water and acidic water, which comprises:
    an electrolyzer for producing strong alkaline reductive electrolyzed water and acidic water comprising:
        a strong alkaline reductive electrolyzed water-producing chamber having a cathode plate, a raw material water introducing inlet, and a strong alkaline reductive electrolyzed water draining outlet;
        an acidic water-producing chamber having an anode plate, a raw material water introducing inlet, and an acidic water draining outlet;
        a partitioning membrane for partitioning the alkaline reductive electrolyzed water-producing chamber and the acidic water-producing chamber;
        a flow path diffusing device in said electrolyzer for diffusing the raw material water in the alkaline water-producing chamber and the acidic water-producing chamber, respectively; and
        said cathode plate and said anode plate being separated by a distance of 0.1 mm to 1 mm.

2. The apparatus according to claim 1, further comprising a circulating path for circulating strong alkaline reductive electrolyzed water or acidic water drained from the strong alkaline reductive electrolyzed water draining outlet or the acidic water draining outlet, and again introducing the water into the electrolyzer; said circulating path being connected to either the strong alkaline reductive electrolyzed water draining outlet or the acidic water draining outlet.

3. The apparatus according to claim 2, further comprising an electrolyte supplying container filled with one or more additives selected from the group consisting of calcium carbonate, sodium bicarbonate, sodium chloride, ammonium chloride, calcium chloride and potassium chloride; said electrolyte supplying container being positioned for supplying electrolyte components in the electrolyzer.

4. The apparatus according to claim 3, wherein an additive in the electrolyte supplying container is in the form of a pellet or a solid.

5. The apparatus according to claim 2, further comprising a gas releasing device for releasing oxygen gas and hydrogen gas produced in the electrolyzer to the outside of the apparatus.

6. The apparatus according to claim 2, further comprising a raw material water supplying device for automatically supplying raw material water at the same amount as that of decreased raw material water, when raw material water circulating in the circulating path is decreased.

7. The apparatus according to claim 1, further comprising a direct current electricity source for supplying electricity to the cathode plate and the anode plate.

8. The apparatus according to claim 7, further comprising a voltmeter for measuring the voltage value of the direct current electricity source, and a detecting device for signaling when the voltage measured by the voltmeter is above a set voltage.

9. The apparatus according to claim 1, further comprising an impurity-removing device for removing impurities from the raw material water introduced into the strong alkaline reductive electrolyzed water-producing chamber.

* * * * *

UNITED STATES PATENT AND TRADEMARK OFFICE
CERTIFICATE OF CORRECTION

PATENT NO. : 6,855,233 B2
DATED : February 15, 2005
INVENTOR(S) : Yuichi Sawada It is certified that error appears in the above-identified patent and that said Letters Patent is hereby corrected as shown below:

Column 12,
Line 56, after claim 9, add claim 10 as follows:
-- 10. The apparatus according to claim 1, wherein the impurity-removing device is one apparatus, or a combination of at least two apparatuses selected from the group consisting of a reverse osmosis membrane filtering apparatus, an ultra filtration membrane filtering apparatus, an ion-exchanging resin treating apparatus, an active carbon treating apparatus, and a zeolite treating apparatus. --.

Signed and Sealed this

Sixth Day of September, 2005

JON W. DUDAS
*Director of the United States Patent and Trademark Office*